(12) United States Patent
Sumcad et al.

(10) Patent No.: US 7,123,907 B2
(45) Date of Patent: Oct. 17, 2006

(54) METHOD AND SYSTEM FOR TESTING CELLULAR NETWORK INTEGRITY USING TELEMATICS

(75) Inventors: Anthony J. Sumcad, Southfield, MI (US); Christopher L. Oesterling, Troy, MI (US); Russell A. Patenaude, Macomb Township, MI (US); Hitan S. Kamdar, Utica, MI (US); Brad T. Reeser, Lake Orion, MI (US); Shpetim S. Veliu, Livonia, MI (US)

(73) Assignee: General Motors Corporation, Detroit, MI (US)

( * ) Notice: Subject to any disclaimer, the term of this patent is extended or adjusted under 35 U.S.C. 154(b) by 194 days.

(21) Appl. No.: 10/801,888

(22) Filed: Mar. 16, 2004

(65) Prior Publication Data

US 2005/0208936 A1 Sep. 22, 2005

(51) Int. Cl.
*H04Q 7/20* (2006.01)
(52) U.S. Cl. .................. 455/423; 455/424; 455/411; 455/435.1; 455/452.1; 340/426.1; 342/69; 342/70; 713/168
(58) Field of Classification Search ................ 455/411, 455/423–425, 11.1, 562.2, 435.1, 452.1, 455; 340/426.1; 342/69–70, 357.1; 713/168, 713/171
See application file for complete search history.

(56) References Cited

U.S. PATENT DOCUMENTS

| 6,785,249 | B1 * | 8/2004 | Soliman ..................... 370/335 |
| 2002/0069312 | A1 * | 6/2002 | Jones ......................... 711/100 |
| 2004/0198366 | A1 * | 10/2004 | Crocker et al. .......... 455/452.1 |
| 2004/0203728 | A1 | 10/2004 | Schwinke et al. |
| 2005/0164695 | A1 | 7/2005 | Kamdar et al. |
| 2006/0079203 | A1 | 4/2006 | Nicolini |
| 2006/0079219 | A1 | 4/2006 | Nicolini |

OTHER PUBLICATIONS

U.S. Appl. No. 11/273,659, filed Nov. 14, 2005, Krause et al.
U.S. Appl. No. 11/396,875, filed Apr. 3, 2006, Zoeckler et al.

* cited by examiner

*Primary Examiner*—Steve M. D'Agosta
(74) *Attorney, Agent, or Firm*—Anthony Luke Simon

(57) ABSTRACT

A method and system for testing cellular network integrity using telematics comprising determining at least one network condition data at a telematics unit, initiating a data call from the telematics unit to a telematics call center, establishing a data call communication channel between the telematics unit and the telematics call center, and transmitting at least one network condition data to the telematics call center via the established data call communication channel. A computer usable medium with suitable computer program code is employed for testing cellular network integrity using telematics.

15 Claims, 2 Drawing Sheets

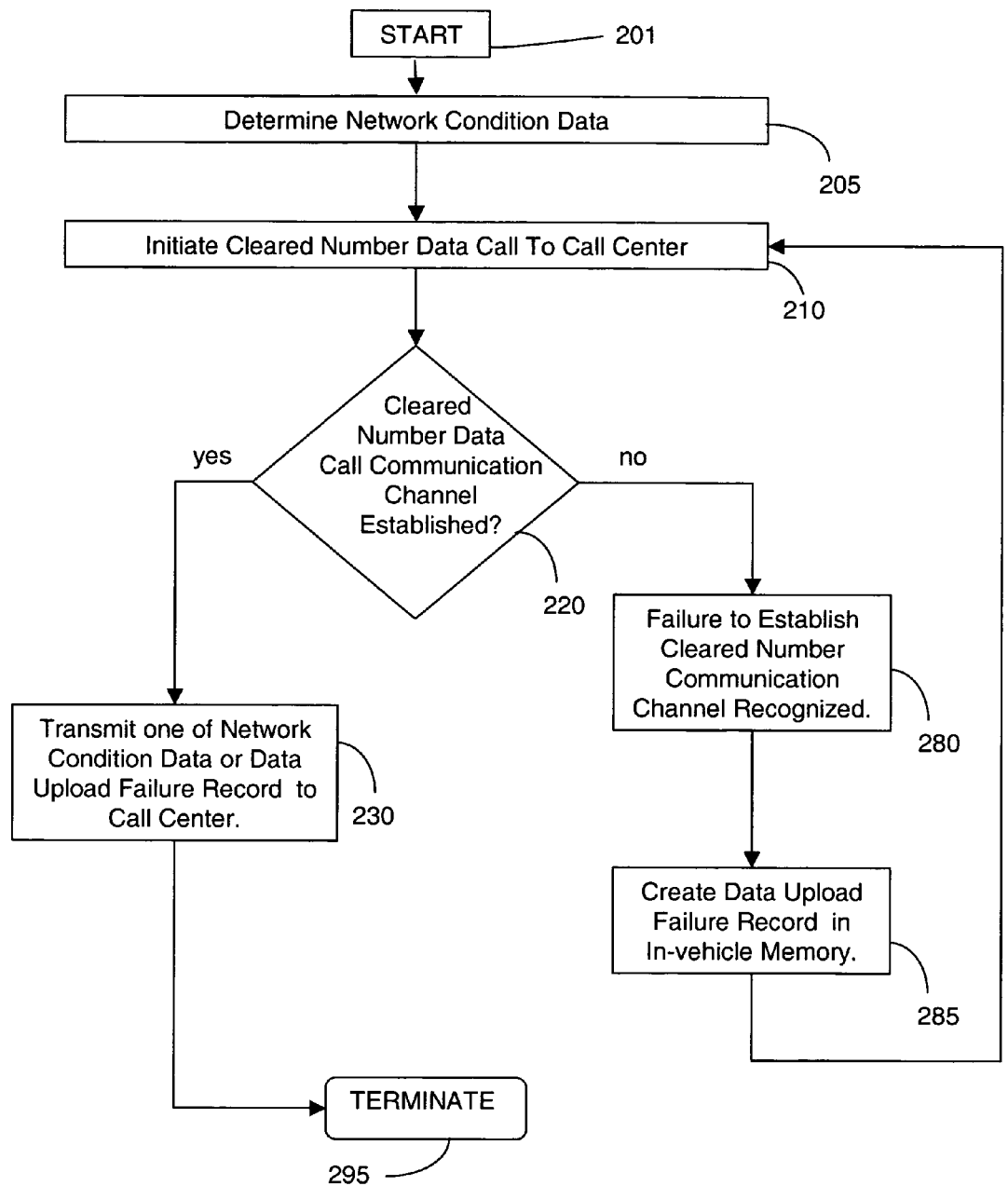

METHOD AND SYSTEM FOR TESTING CELLULAR NETWORK INTEGRITY USING TELEMATICS

FIELD OF THE INVENTION

This invention relates generally to testing cellular network integrity using telematics. In particular the invention relates to testing cellular network integrity using data from vehicles having installed telematics systems.

BACKGROUND OF THE INVENTION

Information and interactive services available to mobile vehicles are increasing due to the demand of mobile vehicle operators for services such as navigation assistance, directory assistance, vehicle maintenance assistance, roadside assistance, information services assistance, and emergency assistance. These services are accessible via interfaces such as voice-recognition computer applications, touch-screen computer displays, computer keyboards, or a series of buttons on the dashboard or console of a vehicle.

Currently, telematics service call centers, in-vehicle compact disk (CD) or digital video display (DVD) media, web portals, and voice-enabled phone portals provide various types of location services, including driving directions, stolen vehicle tracking, traffic information, weather reports, restaurant guides, ski reports, road condition information, accident updates, street routing, landmark guides, and business finders.

For example, traffic and driving directions can be accessed through a voice portal that uses incoming number identification to generate location information based on the area code or prefix of the phone number, or to access location information stored in a user's profile associated with the phone number. Users can be prompted to enter more details through a voice interface. Other examples are web and wireless portals that offer location-based services such as maps and driving directions where the user enters both a start and an end address. Some of these services can have a voice interface.

Providing these services often requires the use of cleared numbers, i.e., numbers that can be used by any phone on the network regardless of the level of service to which the phone is subscribed. These cleared numbers must be properly loaded in the switches of the cellular networks. If a cleared number, for example a telematics service enrollment number that a subscriber calls to configure existing service with the telematics service provider, is not properly loaded, the user must contact the service provider via a landline phone or other means, sometimes inconveniencing the user.

Other network conditions, for example the accuracy of GPS coordinates stored in cellular network switches, adequacy of cellular and GPS coverage areas, and cellular tower capacity also contribute to customer satisfaction or lack thereof. Assuring the reliability of cellular networks is the responsibility of the various cellular network providers. Nonetheless, a telematics service provider has an interest in data collection related to these network conditions because it allows the telematics service provider to locate cellular network trouble spots and provide that data to the cellular network provider, thereby increasing customer satisfaction and reducing costs of operation.

It is therefore desirable to provide a system and method for testing cellular network integrity using telematics that overcomes the limitations, challenges, and obstacles described above.

SUMMARY OF THE INVENTION

One aspect of the present invention provides a method for testing cellular network integrity using telematics, comprising determining at least one network condition data (i.e., body of facts) at a telematics unit, establishing a data call communication channel between the telematics unit and the telematics call center, and transmitting at least one network condition data to the telematics call center via the established data call communication channel.

Another aspect of the present invention provides a system for testing cellular network integrity using telematics, comprising means for determining at least one network condition data at a telematics unit, means for establishing a data call communication channel between the telematics unit and the telematics call center, and means for transmitting at least one network condition data to the telematics call center via the established data call communication channel.

A third aspect of the present invention provides a computer usable medium including computer program code for testing cellular network integrity using telematics, comprising computer program code for determining at least one network condition data at a telematics unit, computer program code for establishing a data call communication channel between the telematics unit and the telematics call center, and computer program code for transmitting at least one network condition data to the telematics call center via the established data call communication channel.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 is a flowchart representative of one embodiment of a method for testing cellular network integrity using telematics, in accordance with the present invention.

DETAILED DESCRIPTION OF THE PRESENTLY PREFERRED EMBODIMENTS

Figure 1:
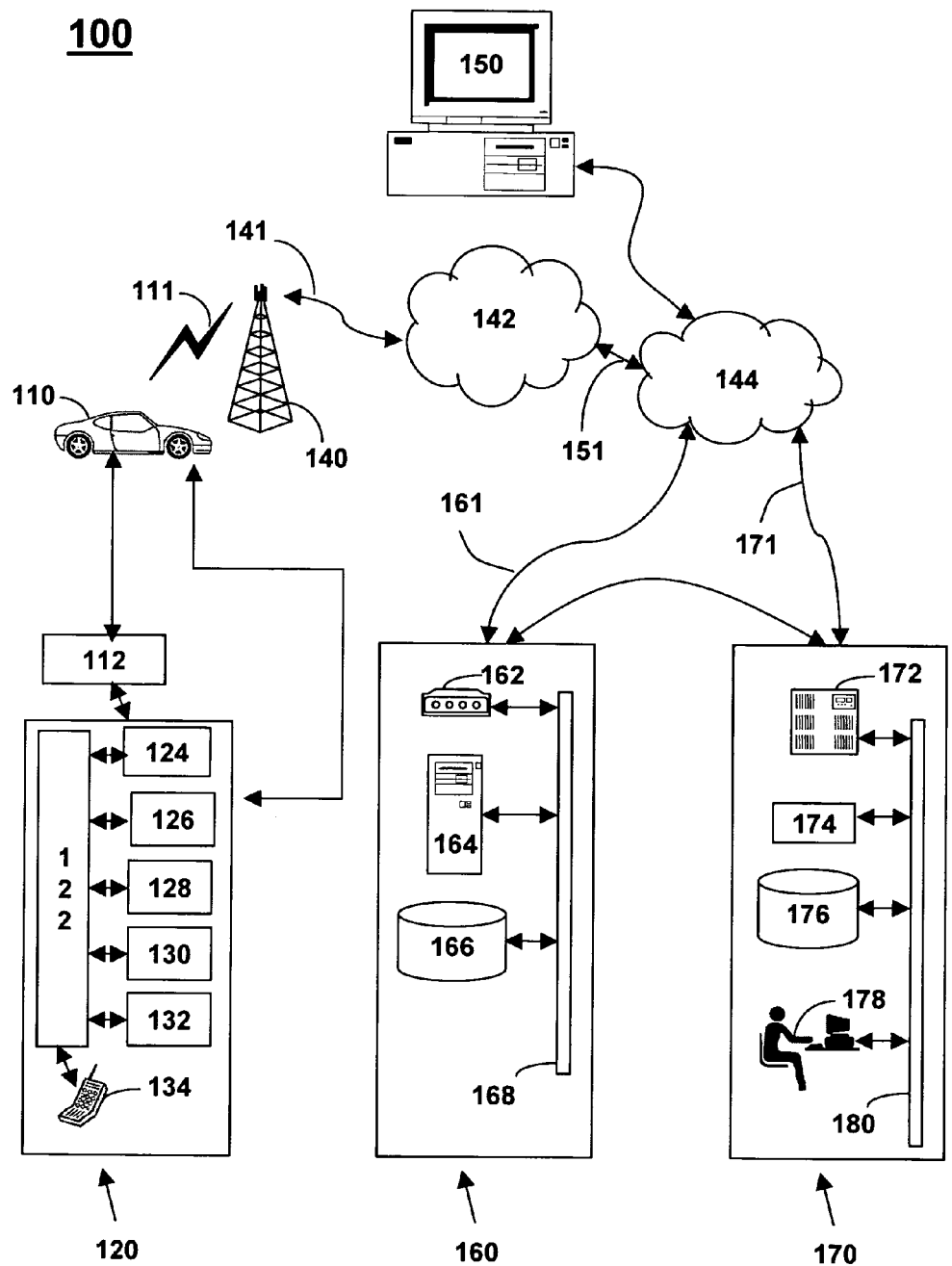
FIG. 1 is a schematic diagram of one embodiment of a system for testing cellular network integrity using telematics, in accordance with the present invention.

FIG. 1 illustrates one embodiment of a system for testing cellular network integrity using telematics, in accordance with the present invention at 100. Cellular network integrity test system 100 includes a mobile vehicle communication unit (MVCU) 110, a vehicle communication network 112, a telematics unit 120, one or more wireless carrier systems 140, one or more communication networks 142, one or more land networks 144, one or more client, personal, or user computers 150, one or more web-hosting portals 160, and one or more call centers 170. In one embodiment, MVCU 110 is implemented as a mobile vehicle equipped with suitable hardware and software for transmitting and receiving voice and data communications. A display may be embedded in MVCU 110. The display may be a dialed digital display such as a radio unit or an instrument panel. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a digital signal processor (DSP) 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion.

In one embodiment, DSP 122 is implemented as a microcontroller, microprocessor, controller, host processor, or vehicle communications processor. In an example, DSP 122 is implemented as an application-specific integrated circuit (ASIC). In another embodiment, DSP 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, an analog, digital, dual-mode, dual-band, multi-mode or multi-band cellular phone.

DSP 122 executes various computer programs that control programming and operational modes of electronic and mechanical systems within MVCU 110. DSP 122 controls communications (e.g., call signals) between telematics unit 120, wireless carrier system 140, and call center 170. In one embodiment, a voice-recognition application is installed in DSP 122 that can translate human voice input through microphone 130 to digital signals. DSP 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers. In an example, signals from DSP 122 can be translated into voice messages and sent out through speaker 132.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in MVCU 110 through wireless carrier system 140, communication network 142, land network 144 and web hosting portals 160 using voice transmissions. In an alternative embodiment, communication services manager 174 communicates with telematics unit 120 in MVCU 110 through wireless carrier system 140, communication network 142, land network 144, and web hosting portals 160 using voice transmissions. Switch 172 selects between voice transmissions and data transmissions.

Cleared number data call connections are used to provide for data uploads from MVCU 110 to call center 170. A cleared number is a number that can be used by any phone on the network regardless of the level of service to which the phone is subscribed. Telematics service providers and other users of the cellular networks make requests for cleared numbers. Examples of cleared numbers are cellular service enrollment numbers and telematics configuration numbers. Cleared numbers are loaded in the cellular network switches of a wireless carrier system 140 by the cellular network provider responsible for those switches.

A cleared number data call connection is established by opening a communication channel from mobile MVCU 110 via telematics unit 120 through at least one of wireless carrier system 140, communication network 142, and land network 144 to web hosting portal 160 or call center 170. The cleared number data call connection is initiated by placing a cleared number data call using a cleared number. The cleared number is a number defined in the cellular network switches of wireless carrier system 140 as a cleared number.

During a cleared number data call, MVCU 110 connects to wireless carrier system 140 by communication channel 111. Wireless carrier system 140 connects to communication network 142 by communication channel 141. Communication network 142 connects to land network 144 by communication channel 151. Land network 144 connects to call center 170 by communication channel 171 or to web hosting portal 160 by communication channel 161. Communication channel 161 can also include communication from land network 144 to web hosting portal 160 and from web hosting portal 160 to call center 170.

A cleared number data call is established by an exchange of handshakes between a wireless modem 124 and a data modem 162 or other modem in call center 170. When receiving a cleared number data call, the call center 170 does not trigger software that places an electronic request for MVCU 110 telematics unit identifiers from the telematics unit 120. These identifiers allow the telematics service provider to determine what services the subscriber has purchased. Services provided through cleared numbers do not require authentication because knowledge of the level of service to which a subscriber is enrolled is not required for these services. A cleared number is sometimes referred to as a non-validating number because the call center does not validate the identity of the caller or the identity of the telematics unit initiating the call. A telematics unit in any MVCU 110 can initiate a cleared number data call. Once the cleared number data call is established, network condition data can be sent over the resulting cleared number data connection.

In the event that one of the communication channels 111, 141, 151, 161 is not connected, a cleared number communication channel from mobile MVCU 110 to call center 170 is not established. After a predetermined number of failures to establish a cleared number data communication channel, the telematics unit 120 will discontinue attempts to establish the connection.

FIG. 2 illustrates a flowchart representative of one embodiment of a method 200 for testing cellular network integrity using telematics in accordance with the present invention.

The method, which begins at 201, is exclusive of any tools employed by cellular network providers for testing their networks. Cellular network providers are responsible for the integrity of the cellular networks. As an end user of cellular network services, a telematics service provider is concerned about network integrity for maintenance of customer satisfaction. The present invention leverages the abundance of telematics units dispersed throughout a particular area to provide data points for assessing network integrity. The collected information is maintained in a database and can be communicated to cellular network providers as needed.

During step 205, the telematics unit determines network condition data. Network condition data (i.e., a body of facts regarding a network condition) comprises one or more types of data selected from the group consisting of a properly loaded number verification, a measured and stored GPS coordinate comparison, a cellular traffic load measurement, a no-cellular-coverage-area identification, and a no-GPS-coverage-area identification.

In one embodiment, the network condition for which data is determined is the proper loading of cleared numbers within a local cellular switching network. As discussed above, a cleared number data call does not require authentication at the telematics call center, thereby eliminating the need for call center advisor 178 or subscriber intervention.

The telematics unit 120 initiates a test to verify proper loading of a number by initiating a call to at least one number from a list of cleared numbers stored in the telematics unit. In one embodiment, the number is a cleared number. When a call fails for lack of a properly loaded number, the telematics unit 120 receives a signal indicating that it is not authorized to place the call. If the telematics unit 120 receives such a signal, the unit generates a memory record containing the number that could not be accessed, the GPS coordinates of the telematics unit 120 at the time the call was placed, and the time that the call was placed.

During step 210, the telematics unit 120 attempts to transmit at least one number data call to the telematics call center 170. In one embodiment, the number data call is a cleared number data call. In one embodiment the number data call is initiated in response to a predetermined time increment programmed in the telematics unit 120. In another embodiment the number data call is initiated in response to the MVCU 110 arriving at a predetermined test point as defined by stored GPS coordinates. In additional embodiments, other call triggers are used such as miles elapsed by MVCU 110, or a trigger signal transmitted from a call center 170 where the trigger signal is based on a physical, logical, or temporal event.

During step 220, a data call communication channel is either established or fails to establish. In one embodiment, the data call communication channel is a cleared number data call communication channel. If the telematics unit 120 detects a data call communication channel comprising communication channels 111, 141, 151, and 171 between the telematics unit 120 and the call center 170, the telematics unit 120 transmits the network condition data to the telematics call center 170 via the established data call communication channel during step 230. The network data condition is stored in one or more databases 176 at call center 170 or in one or more databases 166 at web-hosting portal 160.

Alternatively, if a data call communication channel is not established, the telematics unit 120 recognizes a failure to establish the data call communication channel from the telematics unit 120 to the telematics call center 170 during step 280.

During step 285, upon recognition of the failure to establish the data call from the telematics unit 120 to the telematics call center 170, the telematics unit creates a data upload failure record in in-vehicle memory 128. The data upload failure record comprises the time the recognized failure occurred, the determined network data condition, and a retry counter that indicates the number of times the data upload failure occurred. The data upload failure record is sent to the telematics call center 170 at a predetermined future time. Examples of times the data upload failure record is subsequently sent to the call center 170 are during the next scheduled data call, upon receiving a request sent from the call center to initiate the cleared number data call, or when the telematics unit 120 recognizes it has data for transmittal to the call center 170. In another embodiment, the telematics unit 120 attempts to establish the data call a predetermined number of times before writing the data upload failure record in in-vehicle memory 128 for sending at future time.

During step 295, the flow of method 200 is terminated.

In another embodiment, the network condition for which data is determined is cellular traffic load. When a telematics unit places a data call, such as, for example, a cleared number data call, the success or failure of the connection, including the number of retries attempted, is affected by cellular tower saturation. Cellular tower saturation is typically an issue only at peak traffic periods, such as rush hour in a metropolitan area. Each time a data call is attempted, the telematics unit generates a memory record containing the success or failure of establishing a valid connection using the number, the number of retries attempted, the location of the telematics unit at the time the call was placed, and the time the call was placed. The cellular traffic load measurement when combined with similar measurements obtained from multiple vehicles is used to estimate cellular tower saturation at various times of the day in a particular geographic location. The information is transmitted to a call center as described in the previous embodiment.

In yet another embodiment, the network condition data relates to identification of no-cellular-coverage areas. If the telematics unit 120 is located in an area with no cellular coverage it will fail to receive a signal on a control channel, preventing the telematics unit 120 from placing a data call. The telematics unit will generate a memory record containing the failure to receive the signal on a control channel for placing the cleared number call, the GPS coordinates of the telematics unit at the time the call was attempted, and the time the call was attempted. In another embodiment the telematics unit 120 can monitor and record signal strength and flag locations where no signal is detected. In another embodiment, the telematics unit also includes in the memory record a real-time measurement of the cellular signal strength at the time the call was attempted. Information regarding the network condition is reported to a call center as described above.

In still another embodiment, the network condition is a no-GPS-coverage area. If the telematics unit 120 is located in an area with no GPS coverage, it will fail to receive GPS coordinates when querying the GPS unit 126 of the telematics unit 120. When this occurs, the telematics unit 120 generates a memory record containing the failure to receive GPS coordinates, the last known GPS coordinates of the telematics unit prior to the GPS query failure, and the time the GPS query was attempted. The information collected is reported to a call center as described above. By using data from multiple vehicles within a particular geographic area, the call center determines the location of the no-GPS-coverage area.

In another embodiment, the network condition data is a measured and stored GPS coordinate comparison. On cellular networks a system identification (SID) is a 15 bit number (0–32767) transmitted by every AMPS, N-AMPS, TDMA (ANSI-136) and CDMA (ANSI-95, IS-2000) base station to identify a portion (or all) of a carrier's network. Reception of the transmitted SID by a cellular handset or a telematics unit allows the unit to determine if it is located in its home service area. If a cellular handset or telematics unit 120 receives its home SID, it is not roaming and can determine the geographic area in which it is currently located. The information collected is reported to a call center as described above.

Within a telematics unit, the geographic area encompassed by a particular SID is defined by a range of GPS coordinates associated with that particular SID and stored in the telematics unit. If the GPS coordinates obtained from the GPS unit 126 in the telematics unit 120 do not fall in the range of GPS coordinates associated with a received SID, a failure is noted for the measured and stored GPS coordinate comparison. The telematics unit generates a memory record containing the measured GPS coordinates from the GPS unit of the telematics unit, the received SID, the range of GPS coordinates associated with the received SID, and the time the comparison was made. The information collected is reported to a call center as described above.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for testing cellular network integrity using telematics, the method comprising:
    determining at least one network condition data at a telematics unit;
    initiating a data connection from the telematics unit to a call center using a cleared number;
    detecting a cleared number connection failure;
    determining a connection failure cause based on the cleared number connection failure;
    storing the connection failure cause at the telematics unit;
    generating a data upload failure record at the telematics unit, the data upload failure record including the network condition data, cleared number connection failure and connection failure cause;
    storing the data upload failure record at the telematics unit; and
    sending the stored data upload failure record to the call center.

2. The method of claim 1 wherein initiating the data connection comprises:
    determining the cleared number for a connection from a cleared number data record at the telematics unit;
    testing the cleared number for the connection;
    generating a cleared number test record at the telematics unit; and
    storing the cleared number test record at the telematics unit.

3. The method of claim 1 further comprising:
    receiving an SID at the telematics unit;
    associating the received SID with a geographic area;
    determining a GPS location;
    comparing the determined GPS location with the geographic area associated with the SID;
    determining a measured and stored GPS coordinate failure based on the comparison;
    generating a measured and stored GPS coordinate record based on the determination; and
    storing the measured and stored GPS coordinate record at the telematics unit.

4. The method of claim 1 wherein the data connection is initiated responsive to a trigger signal.

5. The method of claim 1 wherein the stored data upload failure record is sent to the call center call at a substantially regular interval.

6. The method of claim 1 wherein the stored data upload failure record is sent to the call center responsive to the telematics unit arriving at a predetermined test point.

7. A method of testing cellular network integrity using telematics, the method comprising:
    receiving a data upload failure record including a connection failure cause at a call center, the call center configured to receive and service many calls at the same time via a wireless network, and the data upload failure record further including a geographic area associated with the data upload failure record;
    sending the connection failure cause and geographic area to a wireless network; and
    including a measurement time and one of a cellular signal strength measurement or a cellular traffic load measurement with sending the connection failure cause.

8. A computer usable medium storing a computer program including computer program code for testing cellular network integrity using telematics, comprising:
    computer program code for determining at least one network condition data at a telematics unit;
    computer program code for initiating a data connection from the telematics unit to a call center using a cleared number;
    computer program code for detecting a cleared number connection failure;
    computer program code for determining a connection failure cause based on the cleared number connection failure;
    computer program code for storing the connection failure cause at the telematics unit;
    computer program code for generating a data upload failure record at the telematics unit, the data upload failure record including the network condition data, cleared number connection failure and connection failure cause;

computer program code for storing the data upload failure record at the telematics unit; and computer program code for sending the stored data upload failure record to the call center.

9. The computer usable medium of claim 8 wherein the computer program code for initiating the data connection comprises:

computer program code for determining the cleared number for a connection from a cleared number data record at the telematics unit;

computer program code for testing the cleared number for the connection;

computer program code for generating a cleared number test record at the telematics unit; and computer program code for storing the cleared number test record at the telematics unit.

10. The computer usable medium of claim 8 further comprising:

computer program code for receiving an SID at the telematics unit;

computer program code for associating the received SID with a geographic area;

computer program code for determining a GPS location;

computer program code for comparing the determined GPS location with the geographic area associated with the SID;

computer program code for determining a measured and stored GPS coordinate failure based on the comparison;

computer program code for generating a measured and stored GPS coordinate record based on the determination; and computer program code for storing the measured and stored GPS coordinate record at the telematics unit.

11. The computer usable medium of claim 8 wherein the data connection is initiated in response to a trigger signal.

12. The computer usable medium of claim 8 wherein the stored data upload failure record is sent to the call center at a substantially regular interval.

13. The computer usable medium of claim 8 wherein the stored data upload failure record is sent to the call center call in response to the telematics unit arriving at a predetermined test point.

14. A computer usable medium storing a computer program including computer program code for testing cellular network integrity using telematics, comprising:

computer program code for receiving a data upload failure record including a connection failure cause at a call center, the call center configured to receive and service many calls at the same time via a wireless network, and the data unload failure record further including a geographic area;

computer program code for sending the connection failure cause and geographic area to a wireless network; and computer program code for including a measurement time and one of a cellular signal strength measurement or a cellular traffic load measurement with sending the connection failure cause.

15. A system for testing cellular network integrity using telematics, the system comprising:

means for determining at least one network condition data at a telematics unit;

means for initiating a data connection from the telematics unit to a call center using a cleared number;

means for detecting a cleared number connection failure;

means for determining a connection failure cause, and wherein the connection failure cause is stored in a data upload failure record;

means for generating the data upload failure record at the telematics unit wherein the data upload failure record includes the network condition data;

means for storing the data upload failure record at the telematics unit; and means for sending the stated data upload failure record to the call center.

* * * * *